Patented May 6, 1924.

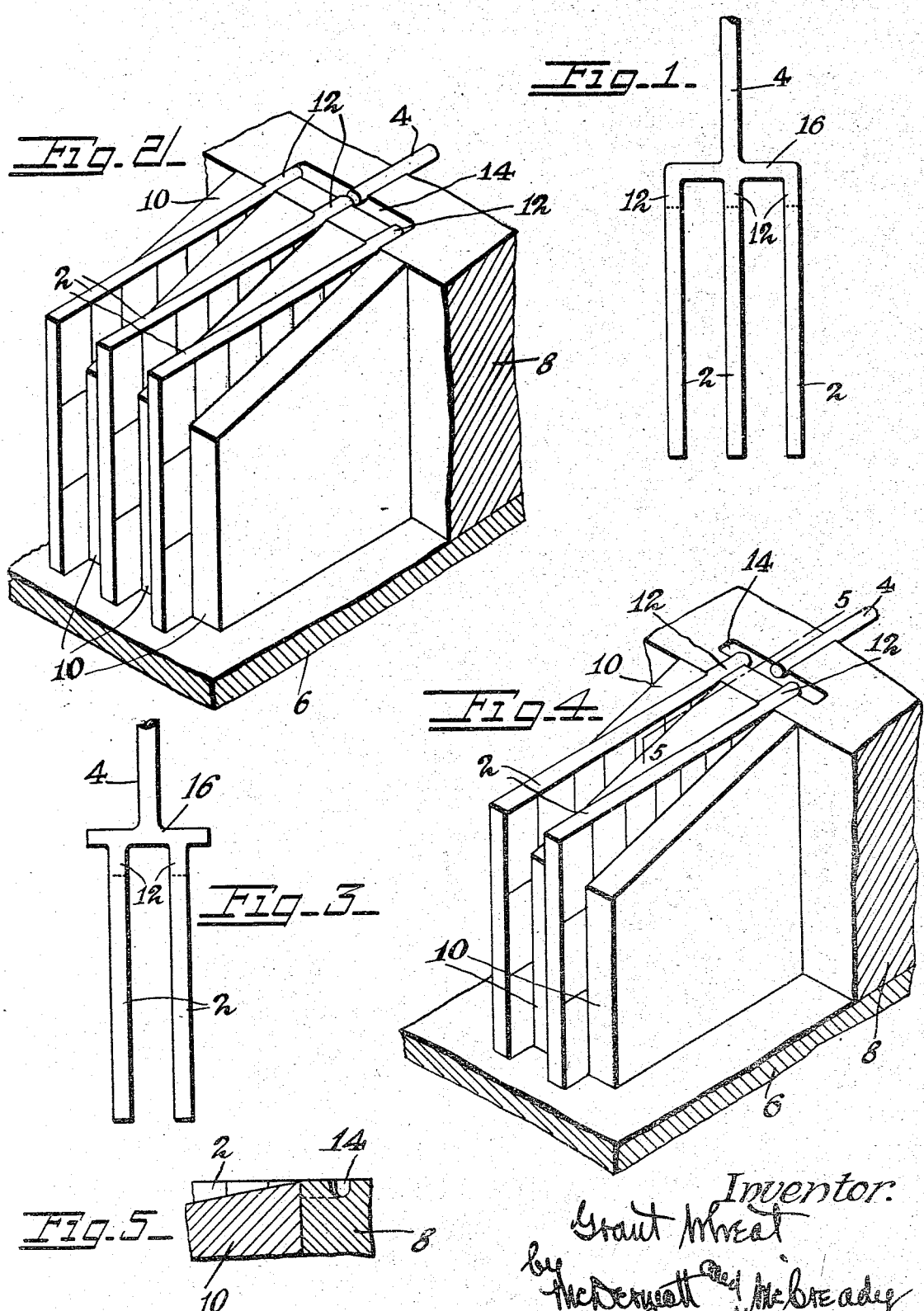

1,492,875

UNITED STATES PATENT OFFICE.

GRANT WHEAT, OF MARLBORO, MASSACHUSETTS.

ELECTRODE AND PROCESS OF MAKING THE SAME.

Application filed February 14, 1918. Serial No. 217,030.

*To all whom it may concern:*

Be it known that I, GRANT WHEAT, a citizen of the United States, residing at Marlboro, in the county of Middlesex and State of Massachusetts, have invented certain Improvements in Electrodes and Processes of Making the Same, of which the following description, in connection with the accompanying drawings, is a specification, like reference characters on the drawings indicating like parts in the several figures.

This invention relates to the manufacture of electrodes of the type used in storage batteries and for similar purposes. The invention is particularly concerned with the problem of joining the terminals to the grids that constitute the foundation of such electrodes, and it aims to provide an improved form of electrode, to devise a novel form of apparatus for use in the manufacture of such electrodes, and to improve the process of manufacturing devices of this kind with the view particularly of reducing the manufacturing cost.

The manner in which it is proposed to accomplish these objects will be readily understood from the following description when read in connection with the accompanying drawings in which:—

Figure 1 is a plan view of an electrode constructed in accordance with the present invention;

Fig. 2 is an angular view of a novel form of apparatus provided for use in joining the grids to the terminal, certain parts of the apparatus being shown in cross-section;

Fig. 3 is a plan view of a slightly different form of electrode;

Fig. 4 is an angular view, partly in cross-section, of an apparatus similar to that shown in Fig. 2, but designed for use in making the electrode shown in Fig. 3; and Fig. 5 is a cross sectional view of a part of the apparatus taken on the line, 5—5, Fig. 4.

The electrodes shown consist of a plurality of grids of the form employed in storage batteries, these grids being made of lead or a composition in which lead predominates. The grids 2 and the terminal 4 are made independently and the problem is to connect these parts in the relationship which it is desired to have them occupy in the finished article. For this purpose a novel form of apparatus, shown in Fig. 2 is employed. This apparatus comprises a fixture consisting of a base 6, a block 8 secured to said base and a series of partitions also secured to the base. The partitions form stalls and are spaced apart far enough to receive the grids 2, between them and they are of such a thickness that they support the grids in the spaced relationship which is desired for them to have in the battery.

Fig. 2, shows the grids positioned between the partitions, the grids at this time being filled with paste. Each grid has a lead 12 projecting from one corner and these leads rest in grooves formed for them in the upper face of the block 8. The terminal 4 rests in another groove formed in the upper face of the block. These grooves for the grid leads and the terminal lead into a recess or trough 14, extending transversely to the grooves, through its walls from opposite sides thereof respectively. The arrangement is such that when in position the grid leads and terminal all lie in the same plane with their ends extending part way into the trough.

In using the apparatus the grids 2 and the terminal 4 are positioned as shown in Fig. 2, with the leads 12 and the ends of the terminal 4 projecting part way into the trough. The workman then takes a piece of lead and a lead-burners' torch and fills the trough 14 with melted lead, at the same time using the torch to maintain the lead hot enough to fuse the leads 12 and the end of the terminal 4 into the mass of melted metal in the trough, thus forming a firm union between all of these parts. The block 8 obviously should be made of some metal, such as cast-iron, or some heat resisting composition to which the lead will not stick and which will not be disintegrated or otherwise injured by the process just described. After the parts have been cooled they may be lifted out of the fixture and the electrode will then present substantially the appearance shown in Fig. 1. It will be noted that this operation forms a connection or bus 16 that unites the terminal 4 with the leads 12.

It will be readily understood by those skilled in this art that this process can be very conveniently practised and that it avoids many of the disadvantages of the present commercial methods of manufacture since the electrodes and terminals are simultaneously united by the formation of the bus. The union thus formed is strong mechanically and provides a good electrical connection between the grids and the terminal. The fixture sustains all the parts to be united in the proper positions for this operation, so that the workman is required to handle merely the torch and the stick of lead from which he melts the material to fill the trough.

The electrode shown in Fig. 3, is substantially like that shown in Fig. 1, except that it has only two grids and the ends of the bus are projected slightly beyond the sides of the grids. Consequently the fixture shown in Fig. 4, is substantially like that shown in Fig. 2 except that the trough 14, is extended past the grooves in which the leads 12 are positioned.

While I have herein shown and described the best form of apparatus for carrying out the process of this invention of which I am at present aware, it is obvious that the process is independent of any particular form of apparatus and that so far as the apparatus feature of the invention is concerned the apparatus shown might be modified in many details without departing from the spirit or scope of the invention.

What is claimed as new is:—

1. An apparatus for uniting storage battery grids to terminals, comprising means for positioning a plurality of said grids and for holding a terminal to which they are to be connected, said means being provided with a trough into which a part of each grid and a part of the terminal project part way from opposite sides thereof.

2. An apparatus for uniting storage battery grids to terminals, comprising a fixture constructed to hold a plurality of grids and a terminal in a predetermined relationship to each other, said fixture being provided with a trough into which portions of said terminal and said grids project through the opposite walls thereof whereby the grids and terminal may be united by fusing metal in said trough and thereby joining the grids and terminal together.

3. An apparatus for uniting storage battery grids to terminals, comprising a fixture having partitions between which the grids may be supported, said fixture having a trough formed therein adjacent to said partitions and having grooves leading from opposite sides of said trough and arranged to receive the leads from the grids and also to hold the terminal to be united to the grids.

4. An apparatus for uniting storage battery grids to terminals, comprising a fixture having parallel spaced walls forming stalls for receiving and supporting grids, and an end block adjacent the ends of said parallel walls having a trough in its upper face extending across said stalls and having also a plurality of grooves leading from one side of the trough to said stalls and a single groove leading from the other side of said trough.

5. An apparatus for uniting storage battery grids to terminals, comprising a fixture constructed to hold a plurality of grids including an end block having means at its upper surface for holding the leads from the grids and a terminal all in the same plane and also having a depressed portion into which the ends of said leads and terminal project.

6. An apparatus for uniting storage battery grids to terminals, comprising a fixture constructed to hold the leads from a plurality of grids and a terminal in end to end relationship to each other, said fixture being provided with a trough into the opposite sides of which said terminal and leads project respectively whereby the leads and terminal may be united by fusing metal in said trough.

In testimony whereof I have signed my name to this specification.

GRANT WHEAT.